United States Patent [19]

Belart et al.

[11] Patent Number: 4,641,895

[45] Date of Patent: Feb. 10, 1987

[54] BRAKE SYSTEM WITH SLIP CONTROL FOR AUTOMOTIVE VEHICLES

[75] Inventors: Juan Belart, Walldorf; Jochen Burgdorf, Offenbach-Rumpenheim; Hans W. Bleckmann, Obermoerlen; Lutz Weise, Mainz; Wolfram Seibert, Darmstadt, all of Fed. Rep. of Germany

[73] Assignee: ITT Industries Inc., New York, N.Y.

[21] Appl. No.: 660,913

[22] Filed: Oct. 15, 1984

[30] Foreign Application Priority Data

Oct. 26, 1983 [DE] Fed. Rep. of Germany ....... 3338826
Oct. 27, 1983 [DE] Fed. Rep. of Germany ....... 3347752

[51] Int. Cl.$^4$ ............................................. B60T 8/02
[52] U.S. Cl. ................................. 303/119; 60/547.1;
  180/197; 180/244; 303/93; 303/110; 303/114
[58] Field of Search ................... 303/110, 93, 113–119,
  303/10, 61–63, 68–69, 94, 100, 102, 92, DIG.
  1–4, 84; 188/181, 345; 180/197, 275, 244–250;
  60/547.1, 581, 548

[56] References Cited

U.S. PATENT DOCUMENTS

| | | | |
|---|---|---|---|
| 3,081,836 | 3/1963 | Hill | 180/244 |
| 3,449,019 | 6/1969 | Walker | 303/114 |
| 3,771,839 | 11/1973 | Fink | 303/119 X |
| 3,827,763 | 8/1974 | Kobashi et al. | 303/114 |
| 3,877,756 | 4/1975 | Inada et al. | 303/114 |
| 3,910,643 | 10/1975 | Kobashi et al. | 303/114 |
| 3,927,915 | 12/1975 | Adachi | 303/114 |
| 3,972,382 | 8/1976 | Takayama et al. | 303/114 X |
| 4,057,301 | 11/1977 | Foster | 303/114 |
| 4,206,950 | 6/1980 | Elliott | 303/110 |
| 4,361,871 | 11/1982 | Miller et al. | 303/110 X |
| 4,416,347 | 11/1983 | Bertling et al. | 303/110 X |
| 4,492,413 | 1/1985 | Belart et al. | 303/114 X |
| 4,509,802 | 4/1985 | Solleder et al. | 180/197 X |

FOREIGN PATENT DOCUMENTS

| | | |
|---|---|---|
| 2078323 | 1/1982 | United Kingdom . |
| 2086507 | 5/1982 | United Kingdom . |
| 2086509 | 5/1982 | United Kingdom . |
| 2111149 | 6/1983 | United Kingdom . |

Primary Examiner—Douglas C. Butler
Attorney, Agent, or Firm—James B. Raden; William J. Michals

[57] ABSTRACT

A brake system with brake slip control and traction slip control provided for road vehicles comprises a braking pressure generator (1) comprising a single-type or tandem-type master cylinder (2, 9, 9'), a power brake booster (10, 10', 10") connected upstream in the pedal line and a positioning device (11) between the master cylinder and the power brake booster. Multiple-way valves (4, 5, 5', 5", 5''', 34–36, 49–51, 66–68) are provided which, in the event of brake slip control, cause dynamic fluid delivery out of a dynamic circuit, (e.g., a power brake booster (7, 10, 10', 10")) and which, for traction slip control, will interrupt the connection to the dynamic circuit and bring about direct communication with the auxiliary energy source (8, 8'). The pressure introduced for traction slip control will be delivered by way of the secondary-side or pedal-side chambers (3, 39, 40, 53, 54) within the master cylinder (2, 9, 9') into the working chambers (12, 13) and from there to the wheel brakes of the driven wheels (VR, VL).

1 Claim, 6 Drawing Figures

BRAKE SYSTEM WITH SLIP CONTROL FOR AUTOMOTIVE VEHICLES

BACKGROUND OF THE INVENTION

The present invention relates to a brake system with slip control provides for automotive vehicles which substantially comprises a pedal-actuated braking pressure generator with a master cylinder, to which latter the wheel brakes of the driven wheels are connected via pressure fluid lines, an auxiliary energy supply system and pick-ups for measuring data for the determination of the wheel rotational behavior as well as of electronic circuit configurations for the combination of the test signals and for the generation of slip control signals.

Brake systems of the type initially referred to are known and which permit control of the brake slip whereby locking of the wheels is precluded and the risks incurred are to be eliminated. However, such prior art systems do not have any influence on the wheel spin resulting from excessive driving torque.

It is therefore the object of the present invention to provide a slip-controlled brake system equipped with an auxiliary energy source and necessitating minimum possible constructional elements such that it functions in the presence of excessive driving torque at the driven wheels and limits the traction slip to an optimum value or to at least a favorable value.

SUMMARY OF THE INVENTION

It has been found that this object is achieved in a relatively simple and technically efficient manner by improving upon a brake system of the type referred to hereinabove such that the master cylinder is connected to the auxiliary energy supply system by way of one or several multiple-way valves which, for the purpose of control of the traction slip, allow the build up braking pressure in the working chamber or, in a tandem master cylinder, in the working chambers of the master cylinder and thus in the wheel brakes of the driven wheels.

Hence a brake-slip controlled brake system which takes effect on the driven wheels through the master cylinder circuits is extended to constitute a system which controls both the brake slip and the traction slip by adeptly connecting the auxiliary energy source—in the system's release position when the brake pedal is not applied—by way of controllable valves directly or by circumventing the braking pressure booster circuit to the working chambers of the master cylinder, whereby braking pressure is made available at the wheel brakes of the driven wheels. Consequently, the additional components required for traction slip control are limited to a single or to a plurality of controllable multiple-way valves (e.g., to electromagnetically actuated switching valves) and to the associated circuit electronics for the generation of the control signals.

BRIEF DESCRIPTION OF THE DRAWING

Further features, advantages and applications of the present invention are described in the following detailed description of preferred embodiments with reference to the accompanying drawing in which.

DETAILED DESCRIPTION

Figure 1:
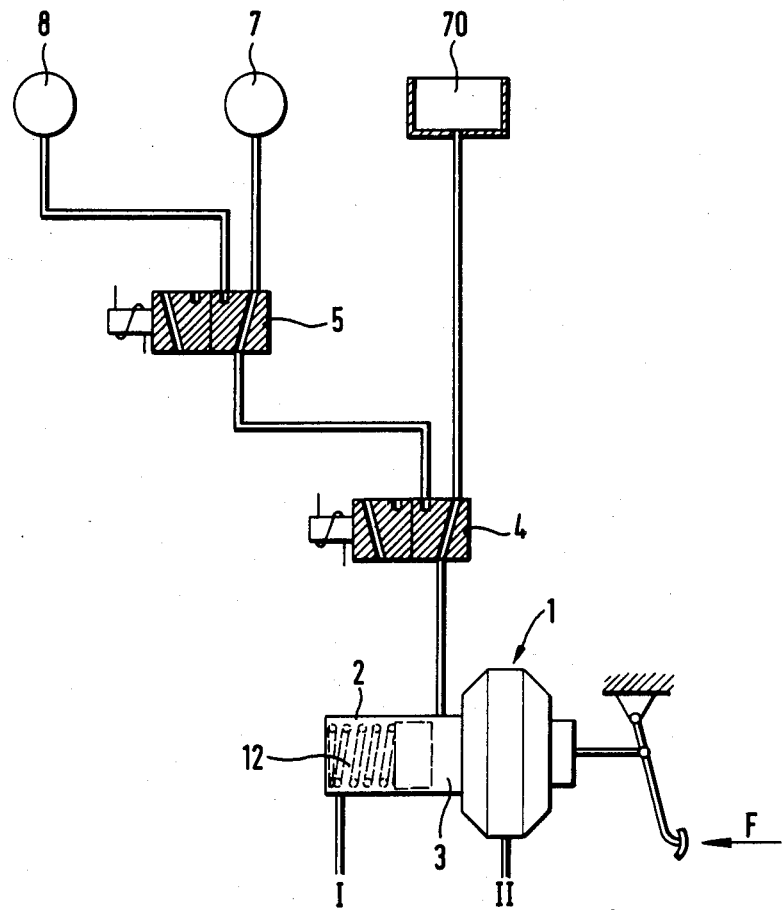
FIG. 1 is a schematic view of the arrangement and the switch positions of multiple-way valves, through which pressure medium can be supplied out of the dynamic circuit or out of the auxiliary energy source into the master cylinder, according to a first embodiment of the present invention.
Figure 2:
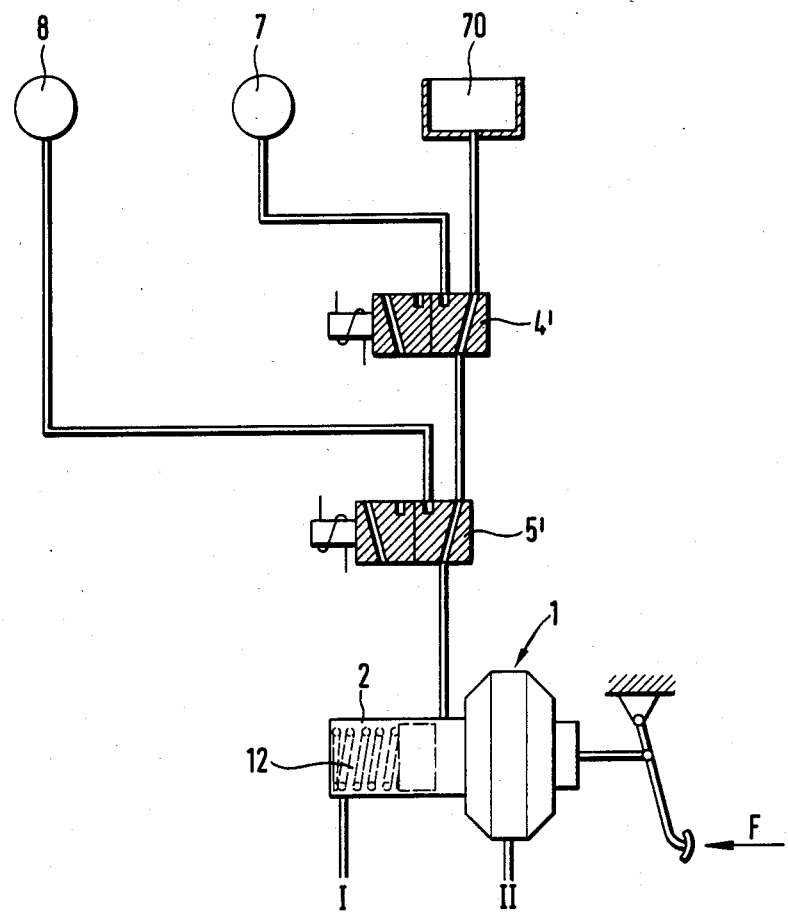
FIG. 2 is a view similar to that of FIG. 1 of a second embodiment of this invention.
Figure 3:
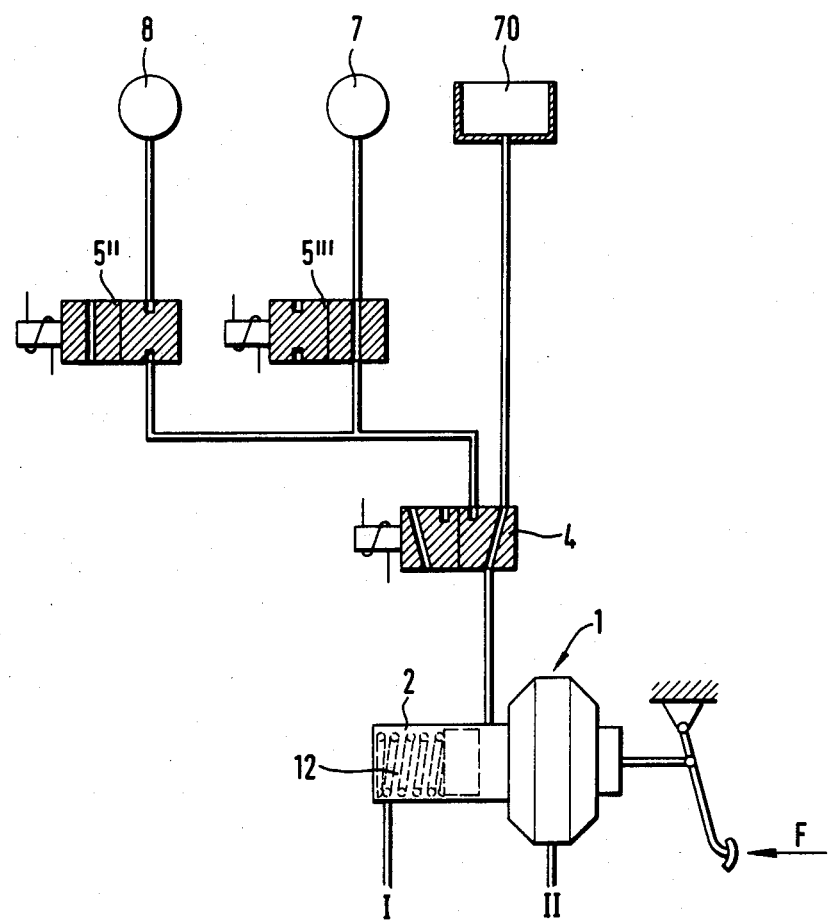
FIG. 3 is a similar presentation of a third embodiment.

The principle of the inventive traction-slip controlled brake systems becomes particularly evident from the simplified symbolical illustration in Figs. 1 to 3. That is to say, according to FIG. 1, a pedal-actuated braking pressure generator 1 comprises a master cylinder 2, the pedal-side chamber 3 of which communicates via a three-way/two-position control valve 4 with a pressure supply reservoir 70 in the initial or release position of the brake system. Pressure medium will be introduced after this multiple-way valve 4 has been switched over, and namely, according to the switch position of a second three-way/two-position control valve 5, out of a dynamic circuit 7, for example, out of a power brake booster, as will be described in more detail hereinbelow with reference to FIGS. 4 to 6, or directly out of an auxiliary energy source 8, for instance a hydraulic accumulator.

The reference numerals I and II at the braking pressure generator 1 symbolize ports for the hydraulic brake circuits which lead to the wheel brakes. In the present case, the wheel brakes of the driven wheels are connected to the brake circuit I.

Figure 4:
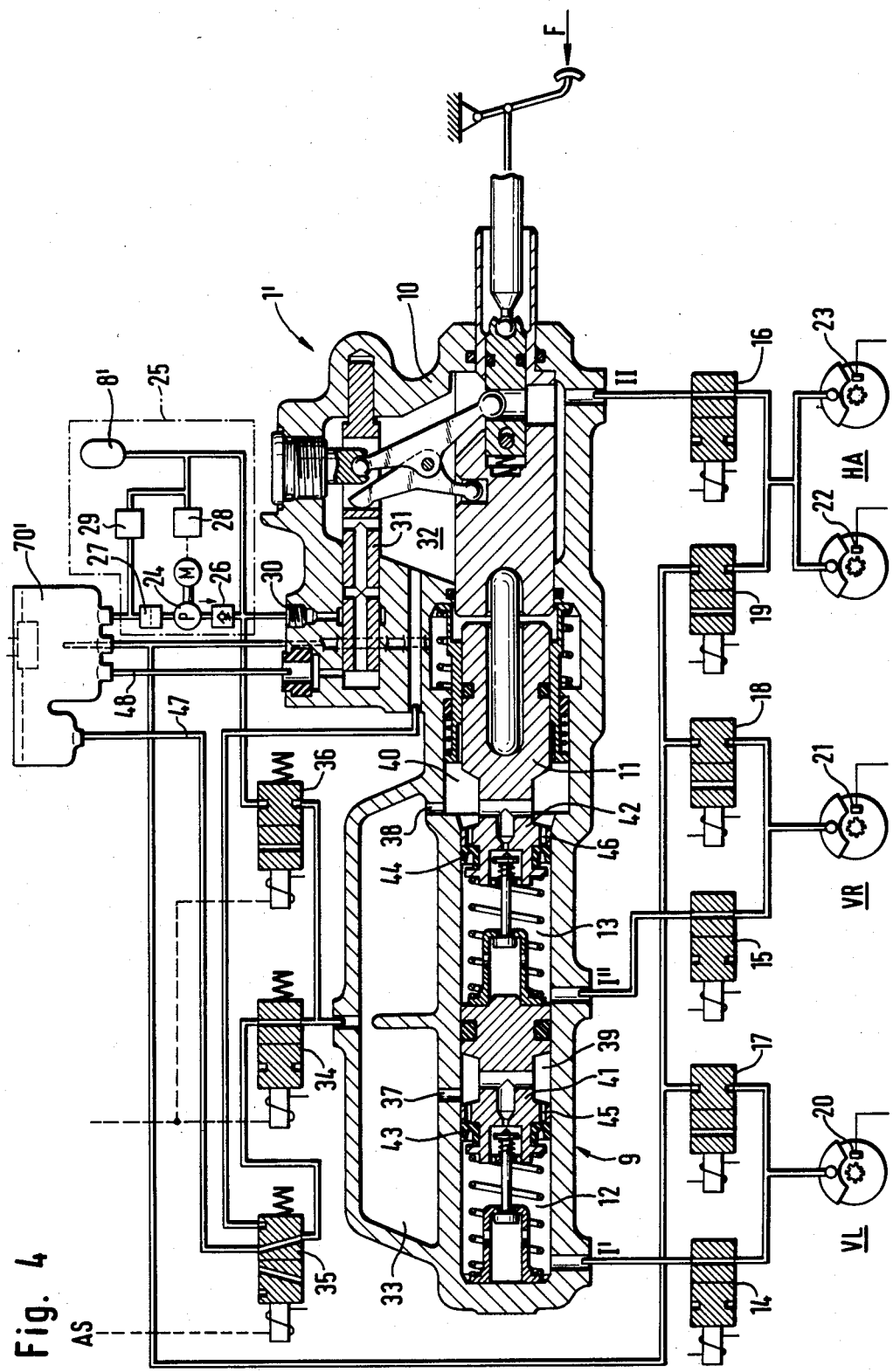
FIG. 4 is a partially cross-sectional, schematically simplified and partially symbolical view of a brake-slip controlled and traction-slip controlled brake system, which is substantially composed of a tandem master cylinder with a hydraulic power brake booster connected upstream thereof and controllable multiple-way valves in the hydraulic circuits.
Figure 5:
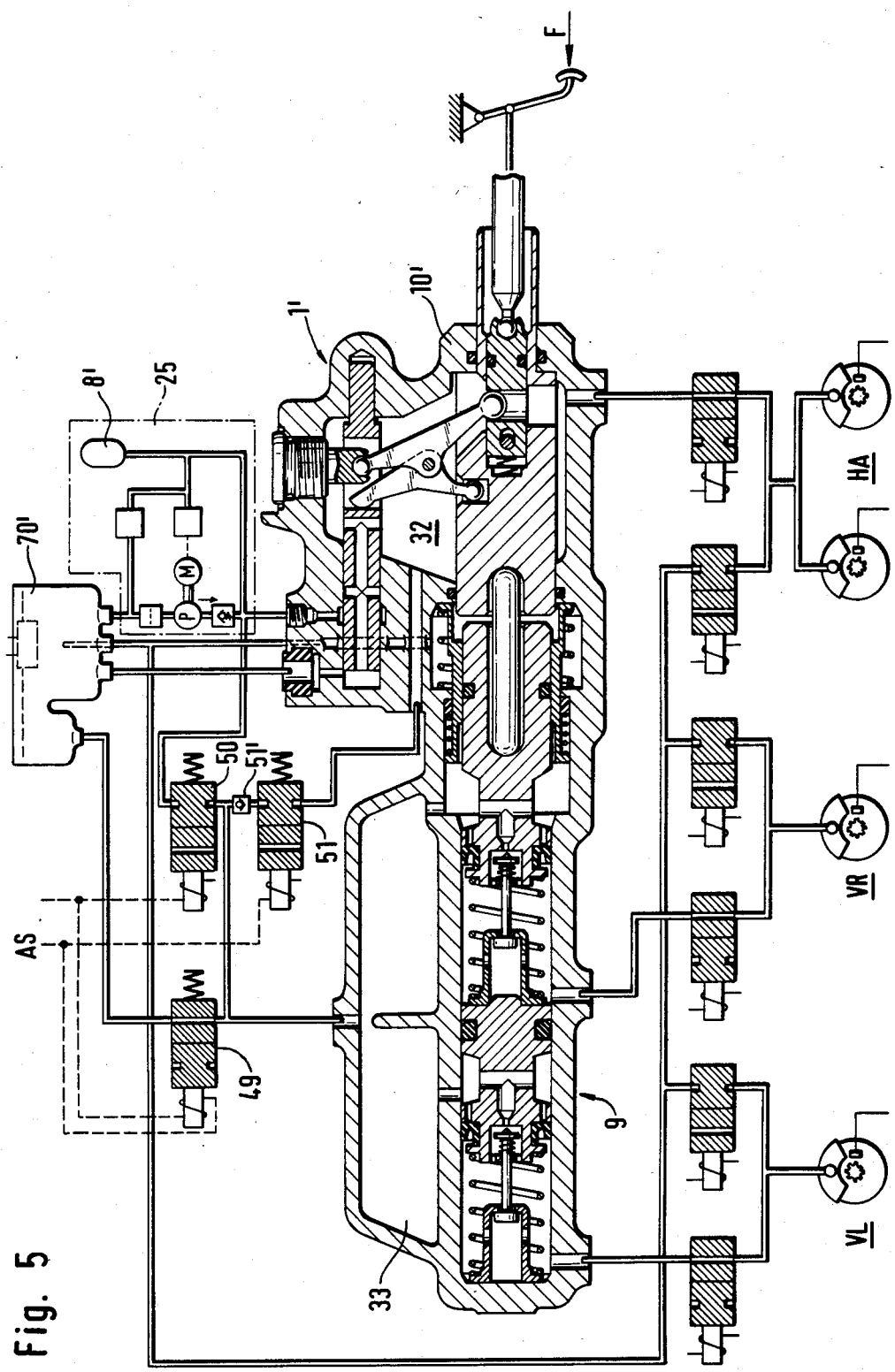
FIG. 5 is a view similar to that of FIG. 4 of an embodiment of the present invention varied compared to FIG. 4 in respect of the valve assembly for the control of the traction slip; and, FIG. 6 is a representation alike that of FIG. 4 and FIG. 5 of a brake-slip controlled and traction-slip controlled brake system according to another embodiment of this invention.
Figure 6:
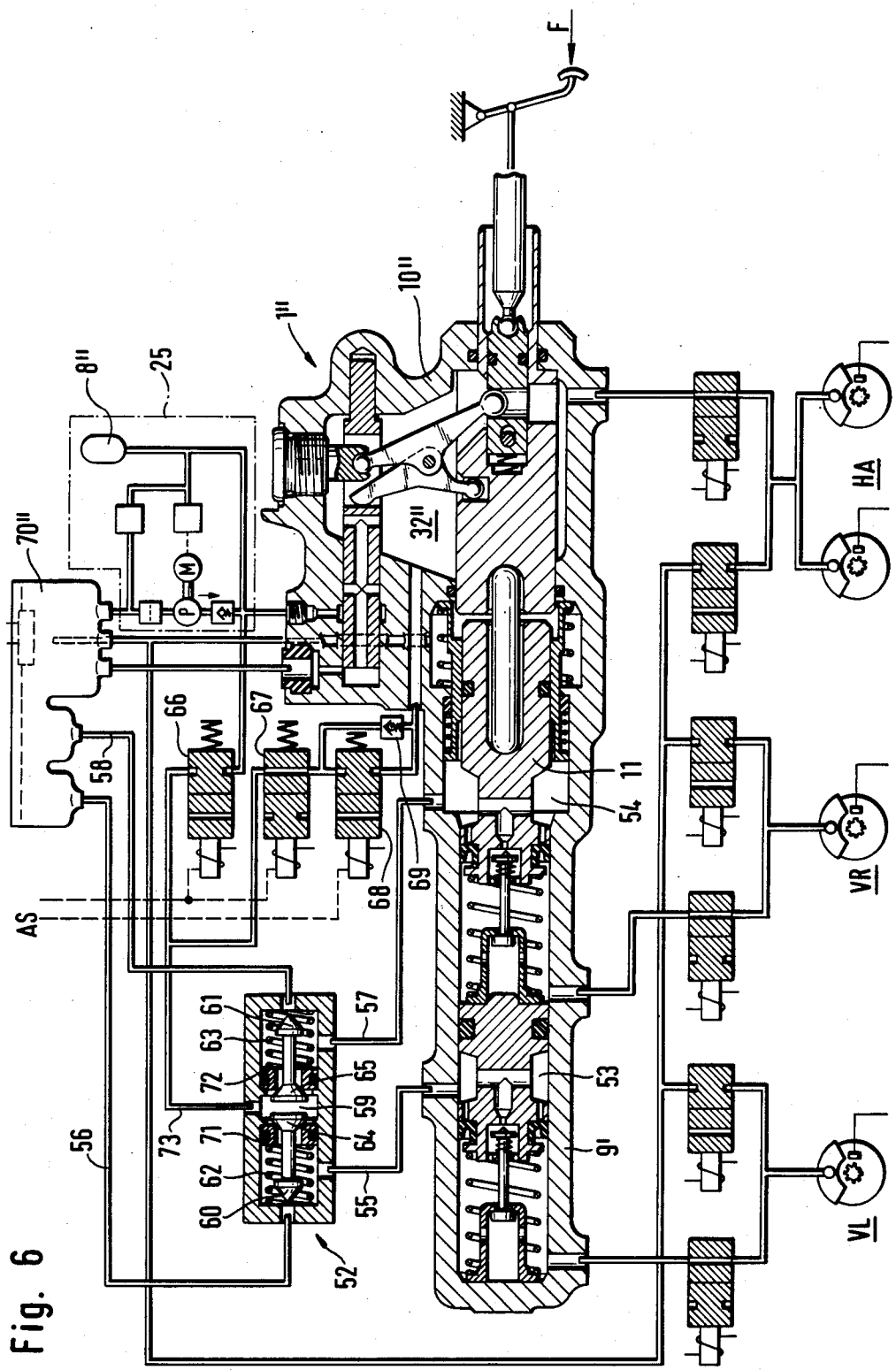

In a brake system of the type shown in FIGS. 4 to 6, a valve having the functions of the three-way/two-position control valve 4 in FIG. 1 is necessary already for brake slip control. This is because via such a valve, which may be designed as a three-way/two-position control valve or likewise have the design of two two-way/two-position control valves, there will take place dynamic introduction of pressure medium into the master cylinder circuits in the even of brake slip control, what compensates in a known fashion for the discharge of pressure medium into the supply reservoir when braking pressure is decreased upon an imminent locked condition.

The arrangements according to FIGS. 2 and 3 differ from the embodiment according to FIG. 1 only by the course the pressure fluid paths take. Therefore, parts identical in function have been assigned like reference numerals in FIGS. 1 to 3.

While in FIG. 1 the so-termed main valve, that is the three-way/two-position control valve 4 required for brake slip control, is connected directly to the master cylinder 2 and the additional valve 5 required for the traction slip control is connected downstream of said master cylinder, in FIG. 2 the positions of these two valves are interchanged so to speak. The valve 4' in FIG. 2 corresponds to the valve 4 to FIG. 1, 5' corresponds to the valve 5 in FIG. 1. However, that does not alter the basic principle at all.

The embodiment of FIG. 3 differs from that one of FIG. 1 only in that, instead of a three-way/two-position control valve 5 via which either the dynamic circuit 7 or the auxiliary energy source 8 are connected, now two separate two-way/two-position control valves 5" and 5'" are provided. Herein, electric circuits are utilized to ensure that the two valves are not simultaneously opened.

The braking pressure generator 1' according to FIG. 4 consists substantially of a tandem master cylinder 9, of a hydrualic power brake booster 10 connected upstream in the pedal line and of a positioning device 11 interposed between the brake power booster and the tandem master cylinder which, in a known fashion, serves to reset the brake pedal during brake slip control and which prevents the hydraulic volume in the working chambers 12 and 13 of the tandem master cylinder 9 from dropping in too low values even in the event of frequent marked pressure reduction during brake slip control.

In the present embodiment, the driven front wheels VL and VR of an automotive vehicle are connected to the hydraulic circuits I', I" of the master cylinder 9. The rear wheels are jointly acted upon by braking pressure via the hydraulic circuit II of the power brake booster 10. For the purpose of brake slip control, the path leading from the braking pressure generator to the front wheels VL, VR and to the rear axle HA contains each one pressure build-up or inlet valve 14, 15, 16 which is switched to open passage in the initial state, as well as each one outlet valve 17, 18, 19 which is closed in the initial state. All these valves are electromagnetically actuated two-way/two-position control valves. Arranged at the wheels are sensors 20, 21, 22, 23 which serve to determine the wheel rotational behavior. From the resulting signals, control signals for the electomagnetically actuated valves will then be generated electronically in circuitries (not shown) herein.

The auxiliary energy source which, as a whole, is designated by reference numeral 25 is in the embodiment shown substantially composed of an electromotively driven pump 24, a hydraulic accumulator 8, as well as of an associated non-return valve 26, a filter 27, a pressure alarm switch (DWS) 28 and a pressure-relief valve 29. The suction side of the pump 24 communicates with the supply reservoir 70, while the pressure side is connected to the inlet 30 of the braking pressure control valve and the power brake booster 10, respectively. When the brake is applied, hydraulic pressure will be built up in a chamber 32 of the power brake booster 10 starting from the inlet 30 via the channels in the inside of a control piston 31, the magnitude of pressure being dependent upon the force F exerted on the brake pedal. The chamber 32 is in communication with the outlet leading to the brake circuit II.

Besides, a prechamber 33 is allocated to the master cylinder 9 which, in the release position of the brake as long as neither brake slip control nor traction slip control take place, is in connection with the supply reservoir 70' via the two multiple-way valves 34 and 35.

When brake slip control is performed, changing-over of the three-way/two-position control valve 35 causes the prechamber 33 to connect to a dynamic circuit, namely to the chamber 32 of the power brake booster 10, which latter chamber is pressurized in this operating condition. Simultaneously, said valve 35 also serves to interrupt the connection between the prechamber 33 and the supply reservoir 70'.

For the purpose of traction slip control, beside the valve 35, there is still provision of another two-way/two-position control valve 36 which normally assumes the closed position and which, in the event of a control action, establishes a direct connection between the prechamber 33 and the auxiliary energy source 25; by simultaneous switching-over of the valves 34 and 36 from the initial position shown, the connection between the prechamber 33 and the supply reservoir 70' will be interrupted in the event of traction slip control.

The pressure introduced into the prechamber 33 propagates through the bores 37 and 38 in the periphery of the master cylinder 9 to the chambers 39, 40 on the pedal side or, respectively, secondary side of the pistons 41, 42 of the master cylinder. Via feed bores 45, 46 and sleeve seals 43, 44 which perform the function of non-return valves, hydraulic pressure is delivered out of the secondary chambers 39, 40 into the working chambers 12, 13 of the tandem master cylinder.

The mode of operation of the inventive brake system in the embodiment according to FIG. 4 can be summarized as follows: in the event of braking without slip control, braking pressure out of the hydraulic energy supply system 25 will be supplied to the wheel brakes of the rear axle HA, dosed and boosted by the braking pressure booster 10 in dependence upon the pedal force F, via the hydraulic circuit II and via the non-energized valve 16 switched to open passage. At the same time, the boosted pressure acts upon the pistons of the tandem master cylinder arrangement 9, as a result whereof hydraulic pressure will develop in the working chambers 12, 13 and will be delivered via the ports I', I" and via the opened valves 14, 15 to the two front-wheel brakes VL, VR. As soon as brake slip control becomes necessary, pressure will be decreased, maintained constant and re-increased with the aid of the valves 14 to 19. The commencement of brake slip control is joined by the valve 35 switching over from the position shown in FIG. 4 into the second position, thereby causing isolation of the prechamber 33 from the supply reservoir 70' and dynamic pressure delivery out of the booster chamber 32 via the hydraulic connecting line 47. This pressure acts on the positioning device 11, on the one hand, while hydraulic medium is supplied into the working chambers 12, 13, on the other hand.

An important feature of the inventive brake system is to be seen in that the pressure is able to discharge from the prechamber 33 in both switch positions of the valve 35, namely by propagating to the supply reservoir 70', on the one hand, and by propagating, on the other hand, via the port 47, the booster chamber 32 and via the channels in the inside of the control piston 31, which likewise communicate via the connecting line 48 with the pressure supply reservoir 70'.

The electric connecting lines, drawn in dotted lines in FIG. 4, at the symbolically indicated coils of the valves 34, 35, 36 lead to an electronic controller, now shown herein, which controls these valves in dependence upon the rotational behavior and, in some cases, upon other test variables.

The embodiment according to FIG. 5 is identical with the brake system according to FIG. 4 apart from the arrangement and hydraulic circuit configuration of the valves 49, 50, 51. In the embodiment referred to herein, only the valves 49 and 51 will be switched over from the initial positon shown for the purpose of brake slip control.

For the purpose of traction slip control, the valves 49 and 50 will be excited and thereby establish the connection from the auxiliary energy source 25 to the prechamber 33.

The brake system according to the embodiment of this invention illustrated in FIG. 6 contains instead of a prechamber a special double valve assembly 52 which, in the system's release position as long as neither brake slip control nor traction slip control is necessary, will connect the two pedal-side chambers or, respectively, secondary chambers 53, 54 of the tandem master cylinder 9' via separate paths 55, 56 and, respectively, 57, 58 to the supply reservoir 70".

Upon the introduction of pressure into the control chamber 59, the valve cones 60, 61 will abut on their valve seats, thus causing closure of the paths 56, 58 leading to the pressure supply reservoir 70". With the pressure continuing to rise, the two annular pistons 71, 72 will displace in opposition to the force of the return springs 62, 63 as far as to open the conical valves adjacent to the control chamber 59. Thus, pressure can be fed into the secondary chambers 53, 54 by way of the connecting line 73, and the chamber 59.

To enable control of the traction slip, it is required to change over the two-way/two-position control valve 66 for connecting the auxiliary source 25 with the control chamber 59. Moreover, the valve 67 will have to interrupt the connection to the control chamber 32" of the power brake booster in this case. To perform brake slip control, it will be sufficient to energize the two-way/two-position control valve 68, or to switch it over from the inactive position shown, thereby permitting dynamic pressure to flow out of the chamber 32" of the power brake booster by way of the switched-over valve 68 and via the passage in the non-energized valve 67 to the chamber 59 and from there to the secondary sides 53, 54.

The non-return valve 69 in FIG. 6 ensures that, upon termination of a traction slip control action, if there is need, pressure will be able to discharge likewise via the control chamber 32" which latter is unpressurized when the brake pedal is not applied and which is in hydraulic communication with the supply reservoir 70".

Hence follows that the double valve 52 does not only substitute the prechamber 33 according to FIG. 4 and FIG. 5, but permits also to considerably simplify the multiple-way valves which are required for the delivery of dynamic pressure in the event of brake slip control.

What is claimed is:

1. A brake system with slip control for an automotive vehicle having a plurality of wheel brake cylinders associated with the driven wheels of the vehicle, said system comprising, in combination:

a pedal-actuated braking pressure generator including a master cylinder;

a plurality of pressure fluid lines respectively connecting each of said wheel brake cylinders with said master cylinder;

an auxiliary energy source connected to said master cylinder by way of at least one multiple-way valve;

a plurality of wheel sensors respectively coupled to each of said driven wheels for providing electrical signals indicative of wheel rotational behavior;

means coupled to said sensors for providing an output signal indicative of a predetermined wheel rotational behavior;

means responsive to said output signal for controlling said multiple-way valve, wherein braking pressure is made available at said wheel brake cylinder associated with said driven wheels independently of the actuation of said pedal-actuated braking pressure generator; and, wherein said master cylinder is a two-chamber tandem master cylinder which is connected to a pressure supply reservoir (70") by way of a double valve assembly (52) and said double valve assembly (52) being further connected to said auxiliary energy source through said multiple-way valve wherein said auxiliary energy source communicates with the chambers of said two-chamber tandem master cylinder in response to said output signal said double valve assembly (52) being connected to said two-chamber tandem master cylinder by way of first and second pressure fluid lines which are separated from one another, said double valve assembly (52) having first and second valve pistons respectively disposed in said first and second pressure fluid lines each piston being resiliently urged against a valve seat in a control chamber (59) of said double valve assembly (52), said control chamber (59) being connected to said multiple way valve whereby introduction of pressure into said control chamber (59) translates said pistons away from said valve seats thereby connecting said auxiliary energy source to said two-chamber tandem master cylinder.

* * * * *